United States Patent [19]

Raley et al.

[11] Patent Number: 4,561,211

[45] Date of Patent: Dec. 31, 1985

[54] VEHICLE DOOR AND WINDOW ASSEMBLY

[75] Inventors: Ronald J. Raley, Oxford; James R. Warren, Lincoln Park, both of Mich.

[73] Assignee: General Motors Corporation, Detroit, Mich.

[21] Appl. No.: 520,529

[22] Filed: Aug. 5, 1983

[51] Int. Cl.[4] .............................................. E05F 11/38
[52] U.S. Cl. ........................................ 49/374; 49/227; 49/348
[58] Field of Search ................. 49/209, 213, 227, 223, 49/225, 234, 235, 348, 374

[56] References Cited

U.S. PATENT DOCUMENTS

| | | | |
|---|---|---|---|
| 2,024,773 | 12/1935 | Lohrman | 49/374 |
| 2,115,698 | 5/1938 | Axe | 49/213 |
| 2,979,327 | 4/1961 | Swanson et al. | 49/210 |
| 4,240,227 | 12/1980 | Hasler et al. | 49/374 X |

FOREIGN PATENT DOCUMENTS 2435766  2/1976  Fed. Rep. of Germany ........ 49/227

Primary Examiner—Kenneth Downey
Attorney, Agent, or Firm—William A. Schuetz

[57] ABSTRACT

The disclosure relates to a vehicle door and window assembly in which the door has a pair of spaced, arcuate sheet metal guide rails and the window adjacent its side edges is secured to a pair of plastic guides which are slidable on the rails for movement through a path of a given radius and with the guides maintaining the windows substantially flush with the adjacent side door structure. The plastic guides have a transverse dimension, as measured between the rails and the outer window surface, which progressively increases proceeding from their upper ends toward their lower ends so that the window has a radius which is greater than the radius of its path of movement whereby the window is moved away from its outer belt line seal when lowered into the door and whereby the window moves both upwardly and outwardly as it is being raised so that it is also substantially flush with the outer belt line of the door when in its closed position.

3 Claims, 6 Drawing Figures

VEHICLE DOOR AND WINDOW ASSEMBLY

The present invention relates to a vehicle door and window assembly, and more particularly to a vehicle door and window assembly in which a vertically movable window is substantially flush with the adjacent door sides and exterior belt line when in its closed position.

Heretofore, vehicle door and window assemblies have been provided in which guides secured to the movable window along its sides were slidably received in vertical guide tracks in the door frame so that the window was flush or substantially flush with the adjacent door frame or vehicle structure. U.S. Pat. Nos. 2,024,773 and 4,240,227 and European Pat. No. 40588 show such arrangements. The European Pat. No. 40588 also shows employing seals for engaging the outer and inner sides of the guides secured to the side edges of the window to provide inner and outer seals. It is also known to provide a guide track which causes the window to move outwardly as it approaches its closed position so that the window is substantially flush with the exterior belt line of the door. U.S. Pat. Nos. 2,024,773 (FIG. 7) and 2,979,327 show such assemblies. The use of such guide tracks, however, is relatively expensive and they must be accurately positioned so as to achieve the objective of substantial flushness of the window at the exterior belt line when in its closed position.

Accordingly, it is a broad object of the present invention to provide a new and improved vehicle door and window assembly in which the window at its sides and lower end is flush or substantially flush with the adjacent exterior sides and belt line of the door when the window is in its closed position, and which assembly is of a simple and inexpensive construction and lends itself to high volume production.

Another object is to provide a new and improved vehicle door and window assembly, as defined in the preceding object, and in which the door has a pair of spaced generally vertically extending arcuate guide rails, preferably made from sheet metal, and the window adjacent its side edges is secured to a pair of guides, preferably made of plastic, which are slidable on the rails for movement through a path of a given radius and with the guides maintaining the windows substantially flush with the adjacent side door structure, and wherein the guides have a transverse dimension as measured between the rails and the outer window surface which progressively increases the proceeding from their upper ends towards their lower ends thereof so that the window has a radius which is greater than the radius of the path and movement of the guides whereby the window is moved away from its outer belt line seal when lowered into the door and whereby the window moves both upwardly and outwardly as it is being raised so that it is also substantially flush with the outer or exterior belt line of the door when in its closed position.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
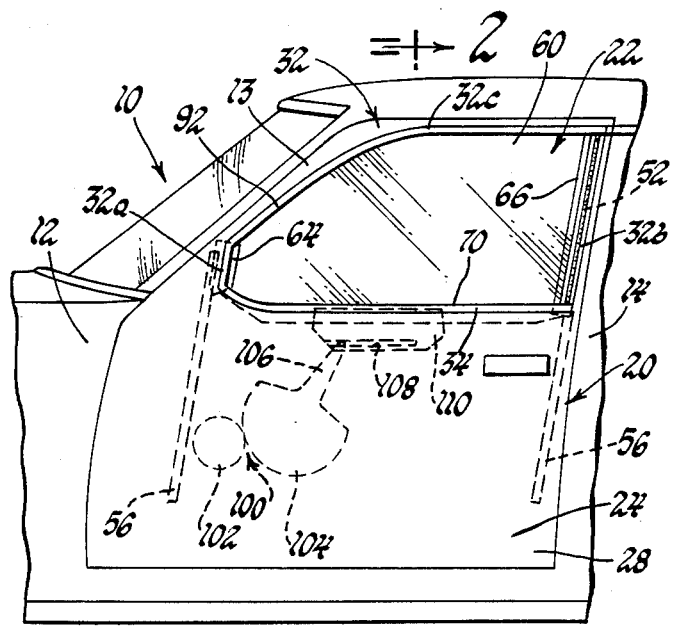
FIG. 1 is a fragmentary side elevational view of a vehicle embodying the novel door and window assembly of the present invention.

Referring to the drawings, FIG. 1 shows an automotive vehicle 10. The vehicle 10 includes side body structure 12, 13 and 14 which defines an opening for receiving a door and window assembly 20.

The door and window assembly 20 comprises a window subassembly 22 and a door 24 which is pivotally hinged (not shown) adjacent its forward end to the body structure 12 for movement between opened and closed positions, and in a manner well known to those skilled in the art. The door 24 comprises inner and outer stamped sheet material parts or panels 26 and 28 which are suitably welded together and spaced end walls 29 (only one of which is shown). The inner and outer panels 26 and 28 adjacent their lower ends are spaced apart and together with the end walls 29 define a well 30. The panels 26 and 28 at their upper ends together define a frame 32 which completely surrounds the window subassembly 22. The frame 32 comprises generally vertically extending forward and rearward side sections 32a and 32b and a top section 32c. The door 24 at its belt line 34 has a horizontally extending opening 36 through which the window subassembly 22 can pass upon being raised and lowered.

Figure 4:
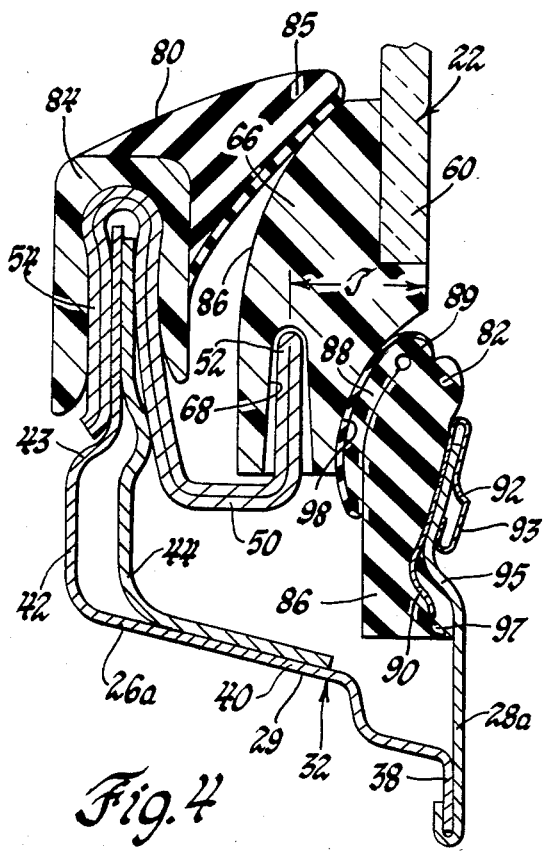
FIG. 4 is an enlarged fragmentary sectional view taken approximately along the lines 4—4 of FIG. 2.
Figure 5:
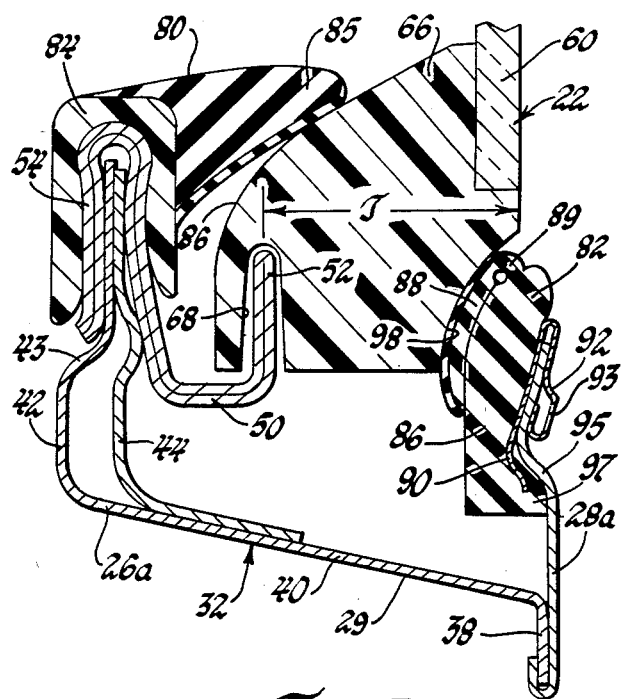
FIG. 5 is an enlarged fragmentary sectional view taken approximately along the lines 5—5 of FIG. 2.
Figure 6:
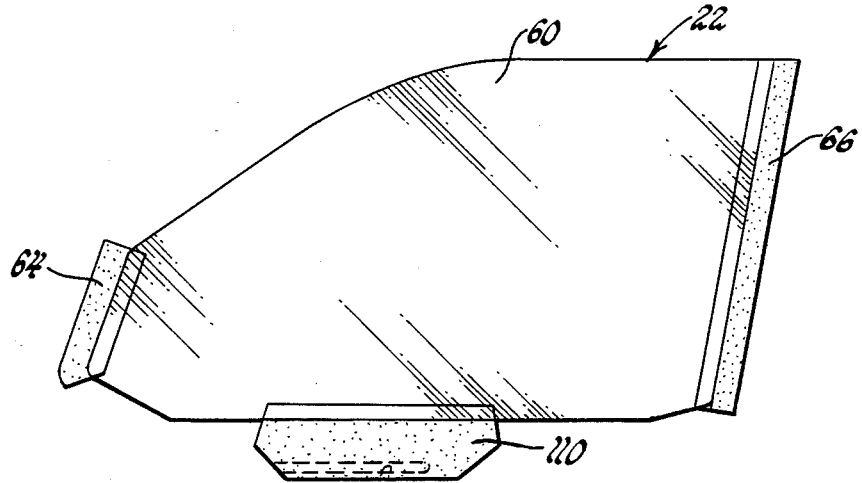
FIG. 6 is a side elevational view of the window assembly.

As best shown in FIGS. 4 and 5, the frame 32 of the door 24 includes an outer side or side portion 28a of the outer panel 28 and an inner side or side portion 26a of the inner panel 26. As best shown in FIGS. 4 and 5, the inner portion 26a of the frame 32 includes a first leg or flange 38 which is welded or otherwise secured to the backside of the outer portion 28a of the frame 32, a second part or section 40 which extends transversely of the outer frame portion 28a and a third part or section 42 which is reversely bent at 43 and which extends generally transversely of the bottom part 40. The portions 26a and 28a of the frame define a generally U-shaped frame 32 facing toward the side edges of the window subassembly 22. The frame 32 also includes an L-shaped member 44 which has one leg thereof welded or otherwise secured to the bottom 40 of the frame portion 26a and the other leg secured to the reversely bent part 43. The L-shaped member 44 serves as a strengthening member to rigidify the frame 32.

Figure 2:
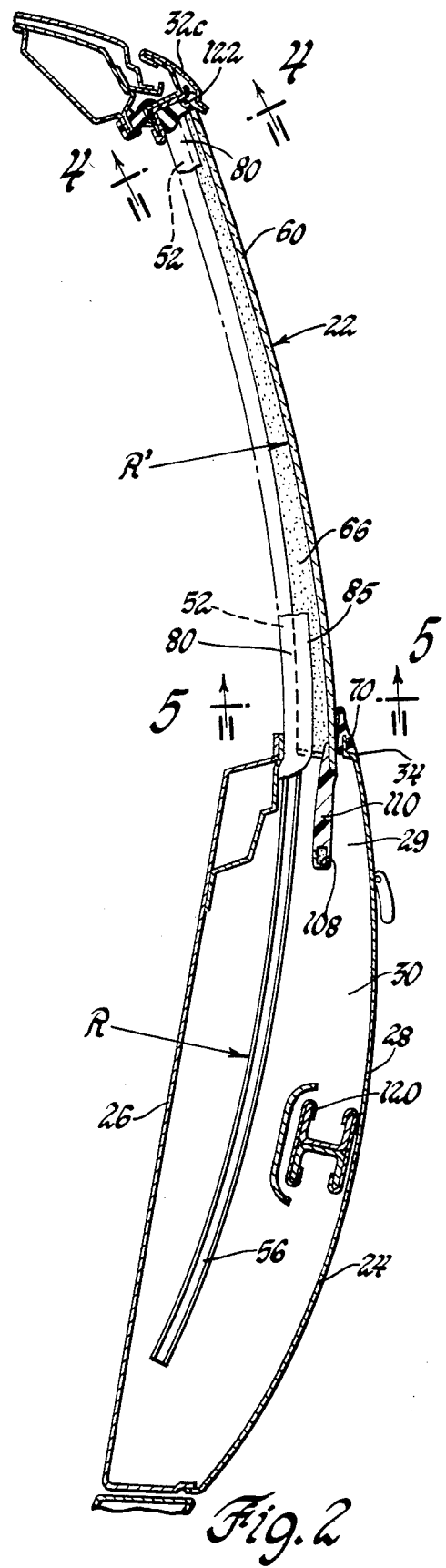
FIG. 2 is an enlarged cross-sectional view taken approximately along the lines 2—2 of FIG. 1.

The legs 42 and 44 of the frame 32 along its side sections 32a and 32b serve as a support for stationary guide means 50. Only the guide means 50 extending along section 32b is shown in FIGS. 2-5 of the drawings, it being understood that an identical guide means 50 extends along section 32a. The guide means 50 comprises a sheet metal member which is folded on itself and then stamped to the configuration shown in FIGS. 4 and 5. As there shown, the guide mean 50 is generally U-shaped and with its free leg defining a rail 52 and its other leg being folded over onto itself to define a clip 54. The clip 54 is pressed over the free ends of the legs 44 and 42 of the frame means 32 and secured thereto. The guide means 50 is curved, as shown in FIG. 2, and extends from the top edge of the frame means 32 to adjacent the belt line 34 of the door 24.

The guide means 50 further includes a pair of spaced rails 56 which are disposed within the well 30 of the door 24 and which are suitably secured to the door 24. The rails 56 form a continuation of the rails 52 and serve to guide the window as it is being lowered into the well 30 of the door 24. The rails 52 and 56 have a radius of curvature R.

The guide rails 52 and 56 serve to guide the window subassembly 22 through an arcuate path of movement. To this end, the window subassembly 22 comprises a window pane 60 and guides 64 and 66 connected to the window 22 along its forward and trailing edges, respectively. The guides 64 and 66 are made from a suitable plastic material and are adhesively bonded to the inside of the window pane 60 adjacent its forward and rear edges. The guides 64 and 66 surround the side edges of the window 60 and lie flush with the exterior surface of the window pane 60. The guides 64 and 66 extend rearwardly and laterally outwardly of the adjacent side edges of the window 60 and each has an elongated curved slot 68 for slidably engaging the rails 52 and 56. As best shown in FIGS. 2, 4 and 5, the guides 64 and 66 have a thickness T as measured from the rail 52 to the plane of the outer surface of the window 60 which progressively increases proceeding from their upper ends toward their lower end. The tapered guides 64 and 66 serve to locate the exterior of the window pane 22 on a radius R' which is greater than the radius of curvature R of the path of movement of the window subassembly 22 along the rails 52 and 56. This has the effect of causing the window 60 as it is being moved towards its closed position to also move outwardly to engage a suitable horizontally extending belt line seal 70 carried by the outer panel 28 of the door 24. When the window 60 is in its raised or closed position and in engagement with the belt line seal 70 it is located substantially flush with the exterior of the outer panel 28 of the vehicle door 24. Likewise, when the window is being lowered into the well 30 of the door 24, the window 60 is moved away from the belt line seal 70 and disengages the same to lessen the friction on the window subassembly 22 as it is being lowered.

Opposite sides of the guide 66 are engaged by seals 80 and 82 which are carried by the frame means 32 and extend throughout the vertical extent of the frame section 32b. Likewise, the opposite sides of the guide 64 are engaged by seals (not shown) in the same manner as the seals 80 and 82 engage the guide 66. The seal 80 has a U-shaped portion 84 which is press fitted over the clip portion 54 of the guide means 50 to retain the seal 80 in place and has a transversely extending portion or lip 85 which engages the rear convex surface 86 of the guide 66. The seal 80 is of a constant cross-section throughout its length. The seal 82 has a body portion 86 and a lip portion 88 which is hinged to the body portion by an integral hinge 89. Embedded within the body portion 86 of the seal 82 is one leg 90 of a reveal molding 92. The other leg 93 of the molding is reversely bent so as to overlie the leg 90. The reveal molding 92 is in the form of a clip and is press fitted onto the free end of the portion 28a of the frame 32. In addition to the reveal molding clip 92 for retaining the seal 82 in place, the upper end 95 of the panel portion 28a is generally S-shaped and is engaged on its back side by a transversely extending portion 97 of the body portion 86 of the seal 82 to further aid in retaining the seal 82 in its position on the panel portion 28a.

The sealing lip 88 is normally self-biased toward a position in which it is not in engagement with body portion 86 of the seal 82, but is deflectable about its hinge 89 towards the position shown in FIGS. 4 and 5 in which it is closely adjacent to or in abutting engagement with the body portion 86 of the seal 82 as a result of its engagement with the concave forward surface 98 on the guide 66. The curvature of the surface 98 of the guide 66 and the shape of the sealing lip are complementary. The arrangement of the window pane 60, seal 82, reveal molding 92 and portion 28a of the frame is such that all of these items are flush or substantially flush with each other.

The window assembly 22 is adapted to be raised and lowered by a suitable window regulator mechanism 100. Although any suitable window regulator mechanism could be used, such as a tape drive or a cable drive system, the window regulator mechanism 100 hereshown includes a first gear 102 which is drivingly connected to a handle (not shown) on the inside of the door and suitably rotatably supported by the inner panel 26 of the door. The gear 102 is in meshed engagement with a sector gear 104 suitably rotatably supported by the panel 26. The sector gear 104 in turn has an arm 106 which swivally carries a suitable roller (not shown) which is slidably received within a cam slot 108 in a plastic sash plate 110 secured to the bottom of the window 60.

Figure 3:
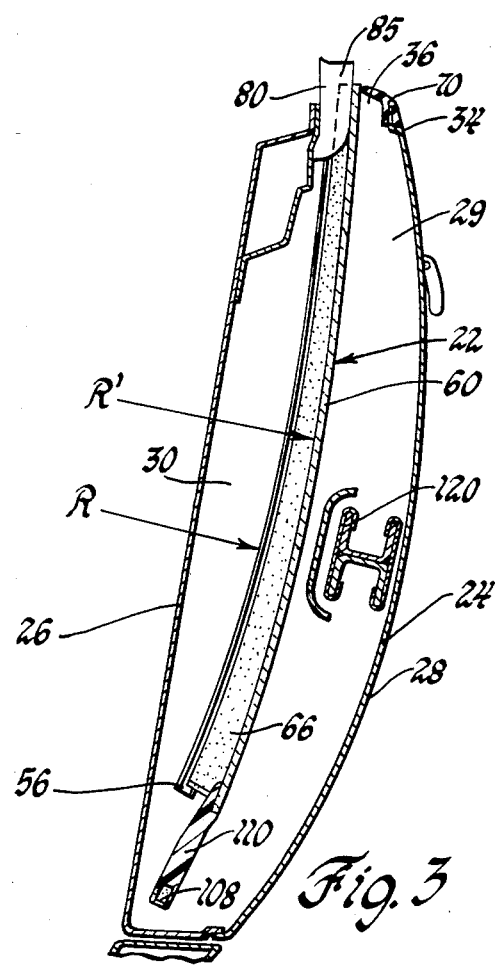
FIG. 3 is a fragmentary cross-sectional view like that shown in FIG. 2, but showing different parts in different positions.

When it is desired to move the window from its closed position, as shown in FIG. 2, toward its open position, as shown in FIG. 3, the operator will rotate the handle inside the car which in turn operates the window regulator mechanism 100 to move the window pane subassembly 22 in a downward direction. The guides 64 and 66 will move along the guide rails 52 and then the guide rails 56 as they are being lowered and with the path of movement being along radius R, as shown in FIG. 2. As the window subassembly 22 is being lowered, it will move away from the belt line seal 70 and disengage the same as it is being lowered so as to reduce friction and thus, require less effort to move the window 60. As the window subassembly 22 is lowered into the well 30 of the door 24, it is positioned inwardly of a side door impact beam 120 adjacent the outer panel 28 of the door 24.

When it is desired to raise the window 60, the operator will manipulate the window regulator mechanism 100 in the opposite directionm to move the window 60 from its open position, as shown in FIG. 3, toward its closed position, as shown in FIG. 2. During this movement the window guides 64 and 66 will move along the guide rails 56 and 52 along the path of radius R. However, since the radius R' of the window pane 60 is greater than the radius R of its path of movement, the window 60 will also be moved outwardly towards the outer door panel 28 as it is being raised. As it continues to move upwardly it will engage the belt line seal 70 and when fully raised will be in the position shown in FIG. 2. In this position the window pane 60 will be substantially flush with the exterior of the outer panel 28 of the door at the belt line 34 and will also be substantially flush with the adjacent exterior door structure surrounding the window 60. The top section 32c of the frame 32 carries suitable seal means 122 for engaging the upper part or edge of the window 60 when the latter is in its closed position to provide a seal along the top edge of the window 60.

An advantage of the present invention is that by using tapered guides 64 and 66, the window 60 is caused to be moved outwardly as it is moved toward its closed position so as to be substantially flush not only with the adjacent side door structure but also substantially flush with door exterior at its belt line. Another advantage is that the seals 80 and 82 for engaging the plastic guides 64 and 66 can be made of a constant cross section throughout their length. Constant cross-section seals are inexpensive as compared to seals having a variable cross section. The latter type of seal would have to be employed if the guides 64 and 66 were of a uniform cross section and the rails 52, 56 positioned so as to cause the window to move toward and from its belt line seal when being raised and lowered.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In an automotive vehicle having a framed door structure defining an opening above its belt line for receiving a curved window pane which is movable between an upper closed position in which it covers said opening and a lower open position in which it uncovers said opening and is received within said door below the belt line thereof, said door having generally vertically extending fixed guide means located adjacent said window pane along its leading and trailing edges, movable guides secured to said window pane adjacent and along its leading and trailing edges and slidably connected with said fixed guide means for upward and downward movement relative thereto, said fixed guide means guiding the movement of said movable guide means through an arcuate path having a given radius when said window is moved between its open and closed positions;

seal means carried by said door along its belt line for engaging said window pane on its exterior side when said window pane is in its closed position, the movement being that said movable guides have a transverse dimension as measured from the window pane to their path of movement which progressively increases proceeding from their upper edges toward their lower edges so that the window pane is spaced further from the fixed guide means at its lower end portion than at its upper end portion so that said window pane has a radius which is greater than said given radius, said movable guides causing the window pane to move away from said belt line seal means as it is moved toward its open position and causing said window pane as it is moved toward its closed position to also move progressively outwardly of said door to engage said seal means and be substantially flush with the door at its exterior belt line thereof.

2. In an automotive vehicle having a framed door defining an opening above its belt line for receiving a curved window pane which is movable between an upper closed position in which it covers said opening and a lower open position in which it uncovers said opening and is received within said door below the belt line thereof, said door having generally vertically extending fixed guide rails located adjacent said window pane along its leading and trailing edges, movable guide means secured to said window pane adjacent and along its leading and trailing edges and having slots for slidably receiving said fixed guide rails for upward and downward movement relative thereto, said fixed guide rails guiding the movement of said movable guide means through an arcuate path having a given radius when said window is moved between its open and closed positions and positioning said window pane so that its leading and trailing edges are substantially flush with the adjacent door structure as it is being moved and when in its closed position, seal means carried by said door along its belt line for engaging said window pane on its exterior side when said window pane is in its closed position, said movable guide means having a transverse dimension as measured from the window pane to their path of movement which progressively increases proceeding from the upper edge of the window pane toward the lower edge of the window pane so that the window pane is spaced further from the fixed guide means at its lower end portion than at its upper end portion so that said window pane has a radius which is greater than said given radius, said movable guide means causing the window pane to move away from said belt line seal means as it is moved toward its open position and causing said window pane as it is moved toward its closed position to also move outwardly of said door to engage said seal means and be substantially flush with the door at the belt line thereof, and flexible second and third seal means carried by said door at locations spaced from said guide rails for engaging said movable plastic guide means along its exterior and interior sides, respectively.

3. In an automotive vehicle having a framed door made from two sheet metal stampings and defining an opening above its belt line for receiving a curved window pane which is movable between an upper closed position in which it covers said opening and a lower open position in which it uncovers said opening and is received within said door below the belt line thereof, said door having generally vertically extending fixed guide rails made from sheet metal and located adjacent said window pane along its leading and trailing edges, movable plastic guide means adhesively secured to said window pane adjacent and along its leading and trailing edges and having slots for slidably receiving said fixed guide rails for upward and downward movement relative thereto, said fixed guide rails guiding the movement of said movable guide means through an arcuate path having a given radius when said window is moved between it open and closed positions and positioning said window pane so that its leading and trailing edges are substantially flush with the adjacent door structure as it is being moved and when in its closed position, seal means carried by said door along its belt line for engaging said window pane on its exterior side when said window pane is in its closed position, said movable guide means having a transverse dimension as measured from the window pane to their path of movement which progressively increases proceeding from the upper edge of the window pane toward the lower edge of the window pane so that the window pane is spaced further from the fixed guide means as its lower end portion than at its upper end portion so that said window pane has a radius which is greater than said given radius, said movable guide means causing the window pane to move away from said belt line seal means as it is moved toward its open position and causing said window pane as it is moved toward its closed position to also move outwardly of said door to engage said seal means and be substantially flush with the door at the belt line thereof, and second and third flexible means of constant cross-sectional shape carried by said door at locations spaced from said guide rails and being disposed on opposite sides of said movable guide means, said second and third seal means extending vertically along said opening adjacent its sides and engaging said movable guide means along its exterior and interior sides, respectively.

* * * * *